3,322,796
6α-CHLORO-17α-HYDROXYPROGESTERONE AND INTERMEDIATES OBTAINED IN THE PRODUCTION THEREOF
Howard J. Ringold, Enrique Batres, George Rosenkranz, Octavio Mancera, and Albert Bowers, all of Mexico City, Mexico, assignors, by mesne assignments, to Syntex Corporation, a corporation of Panama
No Drawing. Filed Oct. 31, 1958, Ser. No. 770,916
Claims priority, application Mexico, Nov. 4, 1957, 49,286; Nov. 27, 1957, 49,487; Feb. 25, 1958, 50,220; June 25, 1958, 51,373
27 Claims. (Cl. 260—397.4)

The present invention relates to cyclopentanophenanthrene derivatives and to a process for the production thereof.

More particularly the present invention relates to the novel 6α-chloro progesterone, 6α-chloro-17α-hydroxyprogesterone and its esters of hydrocarbon carboxylic acids of less than 12 carbon atoms, the 21-fluoro derivatives of these compounds, and the 1-dehydro derivatives of the aforementioned compounds. The 6α-chloro compounds as above set forth are potent progestational agents, when administered both by the oral route or by injection, being more potent than other corresponding 6-halo derivatives as for example the 6-fluoro compounds. The present invention also relates to the corresponding 6β-chloro derivatives which are useful intermediates for the production of the aforementioned 6α-chloro compounds.

In accordance with the present invention we discovered that treatment of 3-alkoxy-$\Delta^{3,5}$-pregnadiene with hypochlorous acid or an agent capable of producing this acid afforded directly the 6β-chloro-$\Delta^4$-pregnen-3-one derivative which upon treatment with a strong mineral acid under anhydrous conditions led to the 6α-chloro compound. Treatment of the last compounds with selenium dioxide under the conditions known in the art gave the corresponding $\Delta^1$-dehydro derivatives. Treatment of the 6β or 6α-chloro-$\Delta^4$-pregnen-3-one compounds with an alkyl ester of orthoformic acid led to the formation of novel 3-alkoxy-6-chloro-$\Delta^{3,5}$-pregnadiene derivatives; the last compounds also exhibit progestational activity of long duration. The same novel compounds of the present invention can also be made by reacting the corresponding 5α,6α-oxido-3-ethyleneketal compounds with hydrogen chloride, preferably under anhydrous conditions, as disclosed in U.S. patent application Ser. No. 670,336, filed July 8, 1957, now Patent No. 2,912,520.

The novel compounds of the present invention are illustrated by the following formulas:

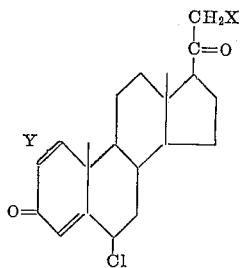
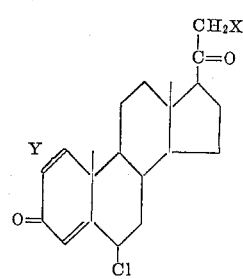

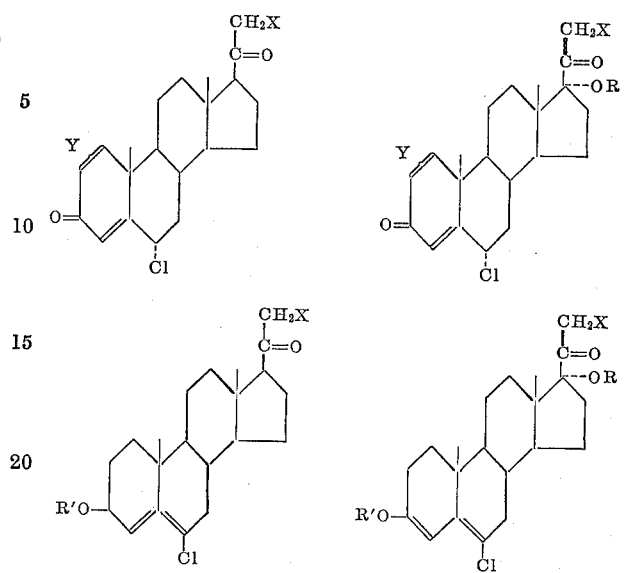

In the above formulas Y represents an additional double bond between C-1 and C-2 or a saturated linkage, X represents hydrogen or fluorine atom, $R^1$ represents a lower alkyl group of less than 6 carbon atoms such as for example methyl, ethyl and propyl and R represents a hydrogen or an acyl group derived from a hydrocarbon carboxylic acid of less than 12 carbon atoms, saturated or unsaturated, straight chain or branched chain aliphatic, cyclic and cyclic-aliphatic which can be further substituted as for example with chlorine or methoxy. Typical examples of such an acyl group are acetate, propionate, enanthate, trimethylacetate, hemisuccinate, cyclopentylpropionate, benzoate, phenoxypropionate and β-chloropropionate.

The novel process of the present invention is illustrated in the following equation:

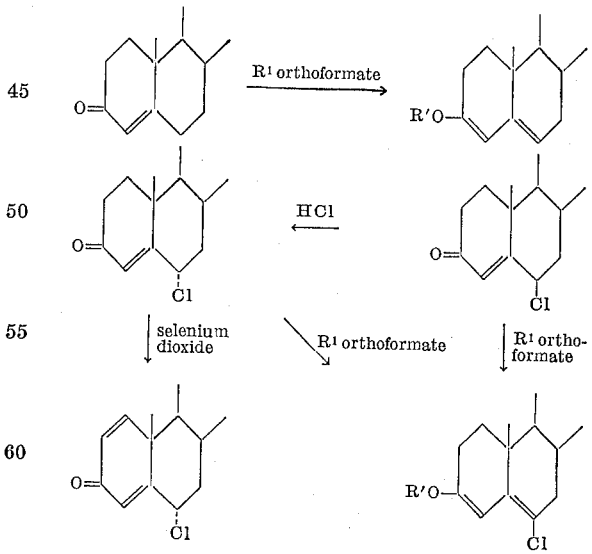

In the above equation $R^1$ represents the same group as above set forth.

In practicing the novel process as above set forth, $\Delta^4$-3-keto steroids, more specifically in the pregnene series, it being further understood that the side chain of the latter compounds be characteristic of progesterone, 17α-hydroxyprogesterone or the corresponding 21-fluoro (disclosed in U.S. patent application Ser. No. 712,299, filed Jan. 31, 1958, now abandoned) compounds or their esters as above set forth and further that such compounds may also be characterized by having the cortical side chain as for example compound "S," cortisone or 9α-halo hydrocortisone or esters or diesters thereof, were treated at room temperature preferably for several hours with a lower alkyl orthoformate such as for example methyl, ethyl or propyl orthoformate in an organic solvent as for example dioxane and in presence of an acid catalyst such as p-toluenesulfonic acid. At the end of the reaction period the resulting 3-alkyloxy-$\Delta^{3,5}$-pregnadiene was precipitated by diluting the reaction mixture with water, containing preferably small amounts of a tertiary amine, such as pyridine, isolated and purified. Treatment of the last compounds with hypochlorous acid or with a reagent capable of liberating the said acid such as for example alkali metal salts of hypochlorous acid or N-chloro amide or imide gave directly the 6β-chloro-$\Delta^4$-3-keto compound. Thus for example the 3-alkyloxy-$\Delta^{3,5}$-pregnadiene compounds dissolved in an organic ketone solvent as for example acetone were treated with N-chlorosuccinimide in presence of sodium acetate, acetic acid and water, preferably at temperatures around 0° C. and for periods of up to several hours. The resulting 6β-chloro-$\Delta^4$-3-keto compounds were precipitated by addition of water, isolated and purified. Treatment of the last compounds dissolved in an organic acid as for example acetic acid or propionic acid, with an anhydrous inorganic acid, preferably dry hydrogen chloride for several hours and at temperatures preferably between 5 to 20° C., followed by isolation and purification gave the 6α-chloro-$\Delta^4$-3-ketone derivative. The introduction of an additional double bond between C-1 and C-2 was preferably accomplished by oxidation with selenium dioxide in t-butanol by the known methods. The 6-chloro-3-alkoxy-$\Delta^{3,5}$-pregnadiene derivatives were prepared by reacting the 6β or 6α-chloro-$\Delta^4$-3-keto compound with a lower alkyl orthoformate under the conditions above set forth.

It may be noted that the process of the present invention may be applied to pregnane compounds having free or esterified hydroxyl groups as above set forth and that the final compounds may be conventionally saponified and the free compounds reesterified in a conventional way.

The following specific examples serve to illustrate but are not intended to limit the present invention.

*Example I*

A solution of 5 g. of progesterone in 35 cc. of anhydrous dioxane was treated with 5 cc. of ethyl orthoformate and 150 mg. of p-toluenesulfonic acid and the mixture was stirred for 30 minutes; 12 cc. of pyridine and 500 cc. of water were slowly added to the stirred solution, with cooling, whereupon an oil separated which crystallized after cooling for 2 hours. The product was extracted with ether, the extract was washed with water, dried over anhydrous sodium sulfate, filtered and evaporated to dryness under reduced pressure. Recrystallization of the residue from methanol yielded the 3-ethylenol ether of progesterone: M.P. 100–150° C., $[\alpha]_D$ −36° (chloroform); λ max. 240–42 mμ, log E 4.33.

A mixture of 5 g. of the above enol-ether, 2 g. of anhydrous sodium acetate, 100 cc. of acetone and 20 cc. of water was cooled to 0–5° C. and treated with 3.9 g. of N-chlorosuccinimide and 2 cc. of glacial acetic acid and the mixture was stirred for 30 minutes at 0–5° C. It was then diluted with 250 cc. of water and kept overnight in the refrigerator. The precipitate was collected, washed with water, dried under vacuum and recrystallized from acetone, thus producing 6β-chloroprogesterone, M.P. 185–187° C.

A slow stream of dry hydrogen chloride was introduced for 1 hour into a suspension of 3 g. of 6β-chloroprogesterone in 50 cc. of glacial acetic acid, while the temperature of the mixture was kept between 10° and 15° C.; the mixture was then poured into water and the precipitate was collected by filtration, washed with water, dried and recrystallized from ether, thus furnishing 6α-chloroprogesterone, M.P. 130–132° C., $[\alpha]_D$ +130° (chloroform), λ max. 236–38 mμ, log E 4.19.

*Example II*

A suspension of 5 g. of 17-acetoxyprogesterone in 50 cc. of anhydrous dioxane was mixed with 5 cc. of ethyl orthoformate and 150 mg. of p-toluenesulfonic acid and the mixture was stirred for one and a half hours. The cooled mixture was then treated with 4 cc. of pyridine and 100 cc. of water under stirring and the precipitate formed was collected, washed with water to neutral, dried at room temperature and recrystallized from methanol-water. There was thus obtained 3-ethoxy-17α-acetoxy-$\Delta^{3,5}$-pregnadien-20-one, M.P. 160–162° C.; $[\alpha]_D$ −134° (CHCl$_3$); λ max. 240–42 mμ, log E 4.33.

A mixture of 5 g. of the above enol-ether, 2 g. of anhydrous sodium acetate, 100 cc. of acetone and 32 cc. of water was cooled to 0–5° C. and then treated with 3.9 g. of N-chlorosuccinimide and 2 cc. of glacial acetic acid. The mixture was stirred for 30 minutes at a temperature of 0–5° C., diluted with 300 cc. of water and kept overnight in the refrigerator. The precipitate formed was collected, washed with water, dried in vacuum and recrystallized from acetone. There was thus obtained 6β-chloro-17α-acetoxyprogesterone, M.P. 220–222° C. (dec.); $[\alpha]_D$ +11° (chloroform); λ max. 240 mμ, log E 4.20.

A slow stream of dry hydrogen chloride was introduced into a suspension of 3 g. of the above compound in 50 cc. of glacial acetic acid, while the temperature was maintained below 10° C. After one hour, the mixture was poured into 100 cc. of water containing 20 g. of potassium acetate and cooled. The precipitate was collected by filtration, washed with water, dried and recrystallized from acetone-hexane, thus yielding 6α-chloro-17α - acetoxyprogesterone, M.P. 180–181° C. (dec.); $[\alpha]_D$ +37° (chloroform); λ max. 236 mμ, log E 4.20.

*Example III*

When in the method of the previous examples the ethyl orthoformate was substituted by the propyl triester of othoformic acid, there was obtained as an intermediate 3-propoxy-17α-acetoxy-$\Delta^{3,5}$-pregnadien-20-one.

In the step of introduction of the chlorine atom at C-6β of this enol-ether, the N-chlorosuccinimide was substituted by N-chloroacetamide. There was thus obtained 6β-chloro-17α-acetoxyprogesterone identical to the one obtained in accordance with the method of the previous example.

*Example IV*

In other experiment, instead of starting from 17α-acetoxyprogesterone, there was used the caproate of 17α-hydroxyprogesterone. Following the procedures described in the previous examples, there was obtained the corresponding intermediate enolether, 6β-chloro-17α-hydroxyprogesterone caproate and finally the 17-caproate of 6α-chloro-17α-hydroxyprogesterone.

*Example V*

A mixture of 2 g. of 6α-chloroprogesterone, 100 cc. of t-butanol, 0.8 g. of freshly sublimed selenium dioxide and 0.5 cc. of pyridine was refined under an atmosphere of nitrogen for 56 hours; the mixture was cooled, filtered through celite, the filter cake was washed with hot t-butanol, and the combined washings and filtrates were evaporated to dryness under reduced pressure. The residue was dissolved in acetone, treated with decolorizing carbon, the solution was dried over anhydrous sodium sulfate and evaporated to dryness. Purification of the residue afforded 6α-chloro-$\Delta^{1,4}$-pregnadien-3,20-dione.

Example VI

By dehydrogenation of 6α-chloro-17α-hydroxyprogesterone 17-acetate, in accordance with Example V, there was obtained 6α-chloro-$\Delta^{1,4}$-pregnadien-17α-ol-3,20-dione 17-acetate.

Example VII

By the same method, 6α-chloro-17α-hydroxyprogesterone 17-caproate was converted into 6α-chloro-$\Delta^{1,4}$-pregnadien-17α-ol-3,20-dione 17-caproate.

Example VIII 2.0 g. of 6α-chloroprogesterone was dissolved in 14 cc. of anhydrous dioxane; 2 cc. of ethyl orthoformate and 60 mg. of p-toluenesulfonic acid monohydrate were added and the solution was stirred at room temperature for 30 minutes; 200 cc. of water, containing 5 cc. of pyridine was added, the mixture was cooled and extracted with ether. The etherate extract was washed with water, dried over anhydrous sodium sulfate and taken to dryness.

Purification of the crude residue by crystallization afforded 6-chloro-3-ethoxy-$\Delta^{3,5}$-pregnadien-20-one.

Example IX

By the same method there were produced the 17-acetate and caproate of 6-chloro-3-ethoxy-$\Delta^{3,5}$-pregnadien-17α-ol-20-one.

Example X

Substituting ethyl orthoformate for propyl orthoformate there were produced the corresponding 3-propyl enol ether derivatives of 6-chloroprogesterone, 6-chloro-17α-acetoxyprogesterone and 6-chloro-17α-propionoxyprogesterone.

Example XI

Substituting in Example VIII 6α-chloroprogesterone for 6β-chloro progesterone there was produced 6-chloro-3-ethoxy-$\Delta^{3,5}$-pregnadien-20-one identical to that described in the said example. Substituting 6α-chloro-17α-acetoxyprogesterone for 6β-chloro-17α-acetoxyprogesterone there was produced the same 3-ethyl enol ether as described in Example IX.

Example XII

A cooled solution of 5 g. of 3,20-bis-ethylenedioxy-$\Delta^5$-pregnene of M.P. 180–183° C. in 100 cc. of chloroform was mixed with an ether solution of monoperphthalic acid containing 1.2 molar equivalents of the peracid and the mixture was kept at a temperature between 0° and 5° C. for 24 hours in the dark. The reaction mixture was diluted with water and the organic layer was washed with aqueous sodium bicarbonate solution and water, dried over anhydrous sodium sulfate, filtered and evaporated to dryness. Chromatographic purification afforded 3,20-bis-ethylenedioxy-5α,6α-oxido-pregnane.

2 g. of the above epoxido-ketal was suspended in 50 cc. of glacial acetic acid and a slow stream of dry hydrogen chloride was introduced into the mixture. The reaction product was worked up following the method described in the previous example. There was thus obtained 6α-chloroprogesterone, identical with the final compound of Example I.

Example XIII

A mixture of 5 g. of the 17-caproate of 17α-hydroxyprogesterone, 100 cc. of anhydrous benzene, 40 cc. of ethylene glycol and 600 mg. of p-toluenesulfonic acid was refluxed for 8 hours with the use of an adapter for the continuous removal of the water formed during the reaction. Saturated aqueous sodium bicarbonate solution was added to the cooled mixture and the organic layer was separated, washed with water, dried over anhydrous sodium sulfate and evaporated to dryness under reduced pressure. Crystallization of the residue from acetone-hexane afforded the caproate of 3-ethylenedioxy-$\Delta^5$-pregnen-17α-ol-20-one.

A cooled solution of 5 g. of the above ketal in 100 cc. of chloroform was mixed with an ether solution of permonophthalic acid containing 1.2 molar equivalents of reagent and the mixture was kept for 16 hours in the dark at a temperature of 0–5° C. It was then diluted with water and the organic layer was separated and washed with water to neutral, dried over anhydrous sodium sulfate and evaporated to dryness. Chromatographic purification of the residue yielded the caproate of 3-ethylenedioxy-5α,6α-oxido-pregnan-17α-ol-20-one.

Treatment of 3 g. of the above epoxido-ketal in glacial acetic acid with dry hydrogen chloride, such as has been described for this reaction in Example II, produced the caproate of 6α-chloro-17α-hydroxyprogesterone.

Example XIV

When in the method of the previous example the ethylene glycol was substituted by propylene glycol, there was obtained as an intermediate the caproate of 3-propylenedioxy-$\Delta^5$-pregnen-17α-ol-20-one which was then oxidized with permonophthalic acid to form the caproate of 3-propylenedioxy-5α,6α-oxido-pregnan-17α-ol-20-one. Further reaction of the latter with dry hydrogen chloride afforded the same final compound as that obtained in the previous example.

Example XV

A mixture of 4 g. of 21-fluoro-17α-acetoxyprogesterone, 28 cc. of anhydrous dioxane and 120 mg. of p-toluenesulfonic acid monohydrate was stirred for 30 minutes and then mixed under stirring and cooling with 10 cc. of pyridine and 400 cc. of water; the reaction product was extracted with ether and the extract was washed with water, dried over anhydrous sodium sulfate and evaporated to dryness. The residue crystallized from methanol-water to furnish 21-fluoro-17α-acetoxy-3-ethoxy-$\Delta^{3,5}$-pregnadien-20-one.

3 g. of the above compound was dissolved in 90 cc. of acetone, cooled to 0° C. and treated with 1.6 g. of anhydrous sodium acetate and 3 g. of N-chlorosuccinimide and finally with 1.5 cc. of glacial acetic acid; the mixture was stirred at a temperature of 0–5° C. for 3 hours, mixed with 500 cc. of ice water and kept overnight at 0° C.; the precipitate was filtered, washed with water, dried and recrystallized from a mixture of ether and acetone containing a few drops of pyridine. There was thus obtained 6β-chloro-21-fluoro-17α-acetoxyprogesterone, which was converted into the 6α-isomer through an adequate acid treatment, such as the reaction with dry hydrogen chloride in glacial acetic acid solution.

Example XVI

In the methods of Example XV the acetate group at C-17 of the starting compound was substituted for another ester; thus the 17-caproate of 21-fluoro-17α-hydroxyprogesterone was treated with ethyl orthoformate to produce 21-fluoro-17α-capronoxy-3-ethoxy-$\Delta^{3,5}$-pregnadien-20-one and the latter was converted, by reaction with N-chlorosuccinimide, into 6β-chloro-21-fluoro-17α-capronoxyprogesterone, whose steric configuration at C-6 was inverted by the treatment with dry hydrogen chloride in glacial acetic acid; the 17-cyclopentylpropionate of 21-fluoro-17α-hydroxyprogesterone was converted by reaction with the tripropyl ester of orthoformic acid into 21-fluoro-17α-cyclopentylpropionoxy-3-propoxy-$\Delta^{3,5}$-pregnadien-20-one, which was treated with N-chlorosuccinimide and then with dry hydrogen chloride to give 6β-chloro-21-fluoro-17α-cyclopentylpropionoxyprogesterone and then 6α-chloro-21-fluoro-17α-cyclopentylpropionoxyprogesterone.

Example XVII

A suspension of 1.8 g. of the 21-acetate of cortisone in 2 cc. of ethyl orthoformate, 0.1 cc. of anhydrous ethanol and 10 cc. of anhydrous dioxane was mixed with 0.5 cc. of dioxane containing 0.025 cc. of concentrated sulfuric acid and the mixture was vigorously stirred for 5 minutes when an homogeneous solution was obtained; it was kept for 20 minutes at 25° C. and then 1 cc. of pyridine was added and the solution was evaporated to dryness. The syrupy residue crystallized upon the addition of 5 cc. of methanol containing a few drops of water and recrystallization from methanol containing a little pyridine afforded the pure 21-acetate of 3-ethoxy-$\Delta^{3,5}$-pregnadien-17$\alpha$,21-diol-11,20-dione.

A suspension of 500 mg. of this compound in a mixture of 10 cc. of acetone, 2 cc. of water and 200 mg. of sodium acetate was cooled to 0° C. and treated with 190 mg. (1.2 mols) of N-chlorosuccinimide and then with 0.2 cc. of glacial acetic acid. After stirring for 1 hour the mixture was poured into water and the precipitate of the 6$\beta$-chloro-cortisone 21-acetate formed was collected, washed with water, dried and recrystallized from ether. There was thus obtained 300 mg. of the pure compound, M.P. 169–171° C., $[\alpha]_D$ +107° (chloroform); ultraviolet absorption maximum: $\lambda$ max. 236–8 m$\mu$, log E 4.13.

Example XVIII

A slow stream of dry hydrogen chloride was introduced into a solution of 1 g. of the 21-acetate of 6$\beta$-chloro-cortisone in 50 cc. of glacial acetic acid for a period of 2 hours, maintaining the temperature below 18° C. After pouring into water the precipitate was collected, washed with water, dried and recrystallized from acetone-hexane, thus giving the 21-acetate of 6$\alpha$-chloro-cortisone.

Example XIX

By the same method as described in Example XVII but substituting for N-chloroacetamide, there was produced the 21-acetate of 6$\beta$-chloro-cortisone identical to that described in that example.

Example XX

When in the method of Example XVII the ethyl orthoformate was substituted by propyl orthoformate (tripropyl ester of orthoformic acid), there was obtained the corresponding 3-enol-propyl ether instead of the enol-ethyl ether. Treatment of this compound with N-chloroacetamide as described gave 6$\beta$-chloro cortisone 21-acetate.

Example XXI

A mixture of 5 g. of the 21-acetate of 9$\alpha$-fluoro-hydrocortisone, 35 cc. of anhydrous dioxane, 5 cc. of ethyl orthoformate and 150 mg. of p-toluenesulfonic acid was stirred for 35 minutes and then 5 cc. of pyridine and water were added until complete precipitation of the reaction product. The precipitate was collected by filtration, washed with water, dried and recrystallized from methanol. There was thus obtained the 21-acetate of 9$\alpha$-fluoro-3-ethoxy-$\Delta^{3,5}$-pregnadien-11$\beta$,17$\alpha$,21-triol-20-one, M.P. 158–162° C., $\lambda$ max. 240 m$\mu$, log E 4.31.

A mixture of 4 g. of the 21-acetate of 9$\alpha$-fluoro-3-ethoxy-$\Delta^{3,5}$-pregnadien-11$\beta$,17$\alpha$,21-triol-20-one, 2.1 g. of anhydrous sodium acetate and 120 cc. of acetone was cooled to 0° C. and treated with 3.7 g. of N-chlorosuccinimide followed by 2 cc. of glacial acetic acid; the mixture was stirred for 3 hours at a temperature between 0 and 5° C. and then ice water was added. The mixture was kept overnight at around 0° C., the precipitate was collected by filtration, washed with water, dried under vacuum and recrystallized from ether-acetone containing a little pyridine. There was thus obtained the 21-acetate of 6$\beta$-chloro-9$\alpha$-fluoro-hydrocortisone, $\lambda$ max. 238 m$\mu$, log E 4.17, $[\alpha]_D$ +44° (chloroform).

A mixture of 3 g. of the above compound and 120 cc. of acetic acid was mixed with 4 cc. of aqueous concentrated hydrochloric acid and kept at room temperature for 2 hours; it was then diluted with water and the precipitate was collected by filtration, washed with water, dried in vacuum and recrystallized from acetone-hexane, thus furnishing the 21-acetate of 6$\alpha$-chloro-9$\alpha$-fluoro-hydrocortisone, $\lambda$ max. 235 m$\mu$, log E 4.12, $[\alpha]_D$ +92° (chloroform).

Example XXII

By the same method as described in the previous example, the 21-acetate of 9$\alpha$-chloro-3-ethoxy-$\Delta^{3,5}$-pregnadien-11$\beta$,17$\alpha$,21-triol-20-one was converted into the 21-acetate of 6$\beta$,9$\alpha$-dichloro-hydrocortisone and then into that of 6$\alpha$,9$\alpha$-dichloro-hydrocortisone.

Example XXIII

By the same method as described in Example XXI, the 21-propionate of 9$\alpha$-fluoro-3-ethoxy-$\Delta^{3,5}$-pregnadien-11$\beta$,17$\alpha$,21-triol-20-one was converted into the 21-propionate of 6$\beta$-chloro-9$\alpha$-fluoro-hydrocortisone and then into that of 6$\alpha$-chloro-9$\alpha$-fluoro-hydrocortisone.

Example XXIV

By the same method as described in Example XXI, the 21-cyclopentylpropionate of 9$\alpha$-chloro - 3 - propoxy-$\Delta^{3,5}$-pregnadien-11$\beta$,17$\alpha$,21-triol-20-one was converted into the 21-cyclopentylpropionate of 6$\beta$,9$\alpha$-dichloro-hydrocortisone and then into that of 6$\alpha$,9$\alpha$-dichlorohydrocortisone.

Example XXV

In another experiment, following the method of Example XXI, N-chlorosuccinimide was substituted by N-chloroacetamide, in all these cases 6$\alpha$-chloro-9$\alpha$-fluoro-hydrocortisone, identical to that described in Example XXI has been produced.

We claim:
1. A compound of the following formula:

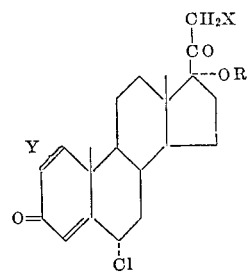

wherein Y is selected from the group consisting of a double bond between C–1 and C–2 and a saturated linkage between C–1 and C–2, X is selected from the group consisting of hydrogen and fluorine and R is selected from the group consisting of hydrogen and a hydrocarbon carboxylic acyl group of less than 12 carbon atoms.

2. 6$\alpha$-chloro-$\Delta^4$-pregnen-17$\alpha$-ol-3,20-dione.
3. The hydrocarbon carboxylic ester of less than 12 carbon atoms of 6$\alpha$-chloro-$\Delta^4$-pregnen-17$\alpha$-ol-3,20-dione.
4. 6$\alpha$-chloro-21-fluoro-$\Delta^4$-pregnen-17$\alpha$-ol-3,20-dione.
5. The hydrocarbon carboxylic esters of less than 12 carbon atoms of 6$\alpha$-chloro-21-fluoro-$\Delta^4$-pregnen-17$\alpha$-ol-3,20-done.
6. 6$\alpha$-chloro-$\Delta^{1,4}$-pregnadien-17$\alpha$-ol-3,20-dione.
7. The hydrocarbon carboxylic ester of less than 12 carbon atoms of 6$\alpha$-chloro-$\Delta^{1,4}$-pregnadien-17$\alpha$-ol-3,20-dione.
8. 6$\alpha$-chloro-21-fluoro - $\Delta^{1,4}$ - pregnadien-17$\alpha$-ol-3,20-dione.
9. The hydrocarbon carboxylic ester of less than 12 carbon atoms of 6$a$-chloro-21-fluoro-$\Delta^{1,4}$-pregnadien-17$\alpha$-ol-3,20 dione.
10. 6$\alpha$ - chloro-$\Delta^{1,4}$-pregnadien-17$\alpha$-3,20-dione 17-acetate.

11. 6β-chloro-Δ⁴-pregnen-17α-ol-3,20-dione.

12. The hydrocarbon carboxylic ester of less than 12 carbon atoms of 6β-chloro-Δ⁴-pregnen-17α-ol-3,20-dione.

13. 6β-chloro-21-fluoro-Δ⁴-pregnen-17α-ol-3,20-dione.

14. The hydrocarbon carboxylic ester of less than 12 carbon atoms of 6β-chloro-21-fluoro-Δ⁴-pregnen-17α-ol-3,20-dione.

15. 6β-chloro-Δ¹,⁴-pregnadien-17α-ol-3,20-dione.

16. The hydrocarbon carboxylic ester of less than 12 carbon atoms of 6β-chloro-Δ¹,⁴-pregnadien-17α-ol-3,20-dione.

17. 6β-chloro-21-fluoro-Δ¹,⁴-pregnadien-17α - ol - 3,20-dione.

18. The hydrocarbon carboxylic ester of less than 12 carbon atoms of 6β-chloro-21-fluoro-Δ¹,⁴-pregnadien-17α-ol-3,20-dione.

19. A compound of the following formula:

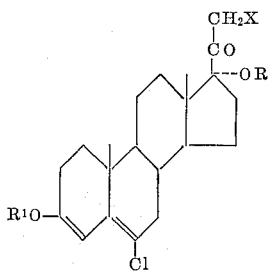

wherein X is selected from the group consisting of hydrogen and fluorine, R is selected from the group consisting of hydrogen and a hydrocarbon carboxylic acyl group of less than 12 carbon atoms and R¹ is lower alkyl.

20. 6-chloro - 21-fluoro-3-lower alkoxy-Δ³,⁵-pregnadien-17α-ol-20-one.

21. The hydrocarbon carboxylic ester of less than 12 carbon atoms of 6-chloro-21-fluoro-3-lower alkoxy-Δ³,⁵-pregnadien-17α-ol-20-one.

22. 6-chloro-3-lower alkoxy-Δ³,⁵-pregnadien-17α-ol-20-one.

23. The hydrocarbon carboxylic ester of less than 12 carbon atoms of 6-chloro-3-lower alkoxy-Δ³,⁵-pregnadien-17α-ol-3,20-one.

24. 6-chloro-3-lower alkoxy-Δ³,⁵-pregnadien-17α-ol-20-one 17-acetate.

25. 6-chloro-17α-acetoxyprogesterone.

26. 6α-chloro-17α-acetoxyprogesterone.

27. 6β-chloro-17α-acetoxyprogesterone.

References Cited

UNITED STATES PATENTS

| | | | |
|---|---|---|---|
| 2,332,815 | 10/1943 | Ruzicka | 260—397.3 |
| 2,818,408 | 12/1957 | Campbell et al. | 260—239.5 |
| 2,835,667 | 5/1958 | Ercoli et al. | 260—239.55 |
| 2,838,528 | 6/1958 | Campbell et al. | 260—397.3 |
| 2,838,531 | 6/1958 | Babcock et al. | 260—397.4 |
| 2,870,174 | 1/1959 | Djerassi | 260—397.4 |
| 2,883,404 | 4/1959 | Gash et al. | 260—397.47 |

OTHER REFERENCES

Tannhauser et al.: J. Am. Chem. Soc., vol. 78 (June 5, 1956), pages 2658 and 2659.

ELBERT L. ROBERTS, *Primary Examiner.*

L. H. GASTON, *Examiner.*

T. J. MORGAN, *Assistant Examiner.*

UNITED STATES PATENT OFFICE
CERTIFICATE OF CORRECTION

Patent No. 3,322,796                                  May 30, 1967

Howard J. Ringold et al.

It is hereby certified that error appears in the above numbered patent requiring correction and that the said Letters Patent should read as corrected below.

Column 2, lines 14 to 24, the left-hand formula should appear as shown below instead of as in the patent:

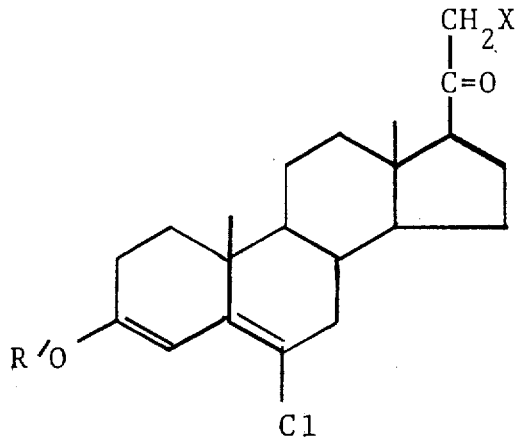

column 3, line 66, for "150" read -- 105 --; column 4, line 71, for "refined" read -- refluxed --; column 10, line 10, for "3,20" read -- 20 --.

Signed and sealed this 3rd day of September 1968.

(SEAL)
Attest:

EDWARD M. Fletcher, Jr.                       EDWARD J. BRENNER
Attesting Officer                             Commissioner of Patents